April 6, 1926.                    1,579,286
O. L. DUPY
DYNAMO ELECTRIC MACHINE
Filed March 15, 1924

Inventor:
Olin L. Dupy
by E. W. Adams Att'y

Patented Apr. 6, 1926.

1,579,286

UNITED STATES PATENT OFFICE.

OLIN L. DUPY, OF NEW YORK, N. Y., ASSIGNOR TO WESTERN ELECTRIC COMPANY, INCORPORATED, OF NEW YORK, N. Y., A CORPORATION OF NEW YORK.

DYNAMO-ELECTRIC MACHINE.

Application filed March 15, 1924. Serial No. 699,437.

*To all whom it may concern:*

Be it known that I, OLIN L. DUPY, a citizen of the United States of America, residing at New York city, in the county of New York and State of New York, have invented certain new and useful Improvements in Dynamo-Electric Machines, of which the following is a full, clear, concise, and exact description.

The present invention relates to machines of the dynamo-electric type operating with alternating current.

An object of the invention is to provide a machine of simple construction which will positively start of itself and which will run in synchronism with the supply current when synchronous speed is reached.

A feature of the invention comprises provisions for starting a machine as a series machine and for thereafter converting it into a synchronous machine. This may include the further feature of provisions for converting a series machine into a repulsion machine during operation, and also provisions for converting a series machine into a repulsion-synchronous machine during operation. These features may comprise arrangements for connecting a low-impedance shunt across the brushes of a machine to produce a repulsion-motor effect and for also connecting a low impedance shunt across two fixed points in the armature winding to produce a synchronous-motor action.

In accordance with the invention, these arrangements may comprise means for changing the circuit after synchronous speed is substantially reached to convert the machine from a series type into a type which will be referred to hereinafter as a repulsion-synchronous machine. That is, while the motor or machine may be considered as being driven as a repulsion motor it has according to the invention, an electrical locking circuit which positively holds the motor in accurate phase agreement with the power supply current.

An advantage of a series machine is the large starting torque which the machine develops and which insures positive starting and pick-up to running speed. In many situations such as in synchronous control of a plurality of machines which may be situated at a distance from one another, it is essential that each motor with its respective individual load start at the same instant upon the closure of the power circuit, and the positive starting characteristics of series machines adapt them for use in such situations. Series machines, however, do not possess constant speed properties with variations of either load or voltage so that if the machine is to be run at a constant speed or if a plurality of the machines are to be run in step with one another, it is necessary to provide a control circuit which becomes operative after the motor is started. Repulsion motors have a better speed voltage characteristic than series motors, and also a better full load torque. However, repulsion motors do not possess as much starting torque as series motors and therefore do not have as positive starting characteristics as do series motors. It is found also that the commutation at full load gives less trouble in the case of a repulsion motor than with a series motor.

In my copending application Serial No. 699,438 filed March 15, 1924, there is disclosed a series machine which is adapted to run as a series synchronous machine after it has been started. It is pointed out in my copending application that in the case of such machines there is a limited voltage range within which constancy of speed or synchronism with the supply current can be maintained. This is due to the dependence inherently present in a series machine between the applied voltage and the speed. The speed voltage characteristic of the repulsion machines however is such that the speed remains invariable or only slightly variable for very large change in applied voltage, after the motor has attained a running speed.

The invention provides means for retaining in the same machine the large starting torque and positive starting characteristics of the series motor, and the improved running characteristics, better commutation and larger full-load torque of the repulsion machine and at the same time provides for holding the machine in substantially absolute synchronism with the supply voltage.

While the invention is applicable to situations in which a single machine is employed which is to be started with large torque and the speed of which is to remain constant, the invention has particular application to situations in which a plurality of machines are to be run in step with each other. In this latter form the invention constitutes an improvement on the arrangement disclosed in the application of H. M. Stoller Serial No. 699,429 filed March 15, 1924. In the Stoller disclosure a plurality of series machines are started as series machines with an interlocking circuit for causing them to accelerate in step with each other and they are thereafter run as series synchronous machines with the interlocking circuit closed, or in case a fixed shunt is provided across the armature the interlocking circuit may be opened after the machines are started.

In accordance with the present invention the machines which are to be run in step with each other are started as series machines interlocked as in the Stoller application to cause them to accelerate in step with each other but after starting the machines the circuit is changed so as to convert the machines into repulsion-synchronous machines. In addition to the disadvantages pointed out hereinabove of starting the machines as repulsion motors there would be the added disadvantage in the case where a plurality of machines are to be run in step with each other that the repulsion machine has a short circuit across the commutator brushes which would greatly reduce the voltage set to be between any two of the interlocking connections and this would result in a small interlocking current. By starting the machines as series machines interlocked, the individual machines have a more positive starting characteristic and also develop a stronger interlocking current since there is no short circuit across the armatures. This results in developing a large restoring torque in case any machine tends to depart from the in-phase position.

The invention will be more clearly understood from the following detailed description in connection with the accompanying drawings, in which.

Figure 1:
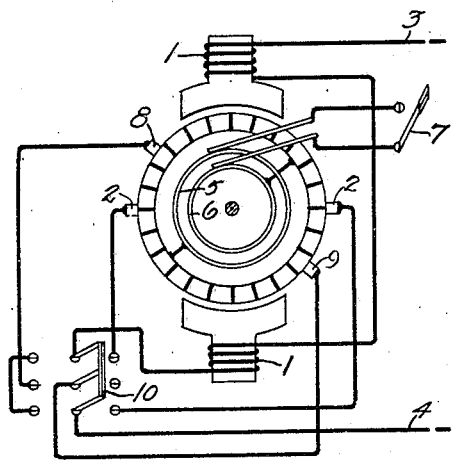
Fig. 1 is a schematic representation of a machine arranged, according to the invention, to start as a series motor and to run as a repulsion-synchronous motor.

In Fig. 1, the field 1 and the brushes 2 associated with the commutator, together with the armature winding (not shown), may be constructed and related as in the usual series motor. The armature is, however, provided with a pair of slip rings 5, 6 and cooperating brushes for bringing out two fixed points in the armature winding about 180 electrical degrees apart, to the short circuiting switch 7. The brushes 8 and 9 which also bear on the commutator are connected to terminals of the three-pole double-throw switch 10, which, as will be seen, controls in one position the connections of brushes 2 to the power leads 3, 4.

With switch 10 closed to the right-hand position, and with switch 7 open, brushes 8 and 9 and also slip rings 5 and 6 are all without effect on the circuit, and brushes 2 are connected in series with the field 1, and between the power mains 3, 4. The machine is thus in condition to operate as the usual series machine. This is the preferred adjustment for starting, since, as is known, a properly constructed series machine starts with good torque from stand-still position. A series machine however, as pointed out above, is generally considered as unsuited to drive apparatus where the requirements are constancy of speed or synchronism between separate machines, as in the case of sound-reproducing apparatus operated to accompany motion pictures, for example.

As stated, the invention provides for converting the machine into a synchronously running machine after synchronous speed is substantially attained, and this result can be realized according to the form of the invention shown in Fig. 1 by throwing switch 10 to its left-hand position and also closing short-circuiting switch 7. Throwing switch 10 to the left position converts the machine into a repulsion motor, since the fields, 1. 1 become connected directly across the mains 3, 4 and the brushes 8 and 9 are short-circuited. Closing switch 7 closes a low impedance shunt across two fixed points in the armature circuit. This latter shunt alters the armature circuit by providing an equalizing path between opposite points in the circuit and results in the armature maintaining close synchronism with the supply current.

This behavior can be accounted for, no doubt, on the general principle that an object, which is free to move in an energy field always takes up, as an equilibrium position, that position at which the stored energy is a maximum. On this basis the armature will follow through a series of positions in each cycle at which the energy used up in useless current flowing through the armature shunt is a minimum. This result occurs when the shunt connects points in the armature circuit that are of equal potential, so that the angular position of the shunt is determined at each instant by the resultant of all the component armature voltages and the armature is therefore constrained to hold a position in synchronism with the applied voltage.

It is found in practice that the brushes 2, 2 and 8, 9 can be moved toward each other until they coincide, without materially changing the operation of the machine.

Figure 2:
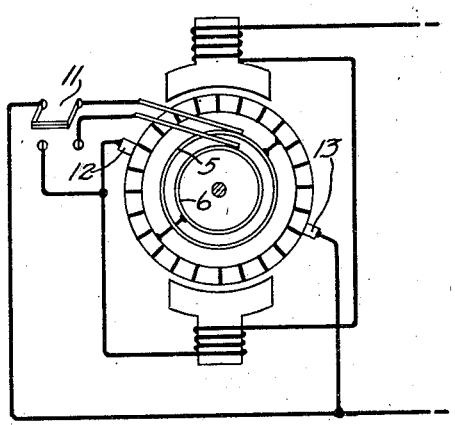
Fig. 2 shows in similar manner a machine employing a somewhat simpler arrangement than the machine of Fig. 1.

Accordingly, one of the pairs of armature brushes can, in some cases at least, be dispensed with, and a construction used such as is shown in Fig. 2. In this figure, when switch 11 is open, the machine is in the condition to start as a series machine. Closing switch 11 converts the machine from ordinary series type to repulsion-synchronous, since the switch short-circuits brushes 12 and 13 and also establishes the fixed shunt across the two fixed points in the armature circuit. The best adjustment of brushes 12 and 13 is readily found by trial. The principle of operation is essentially the same as in Fig. 1.

Figure 3:
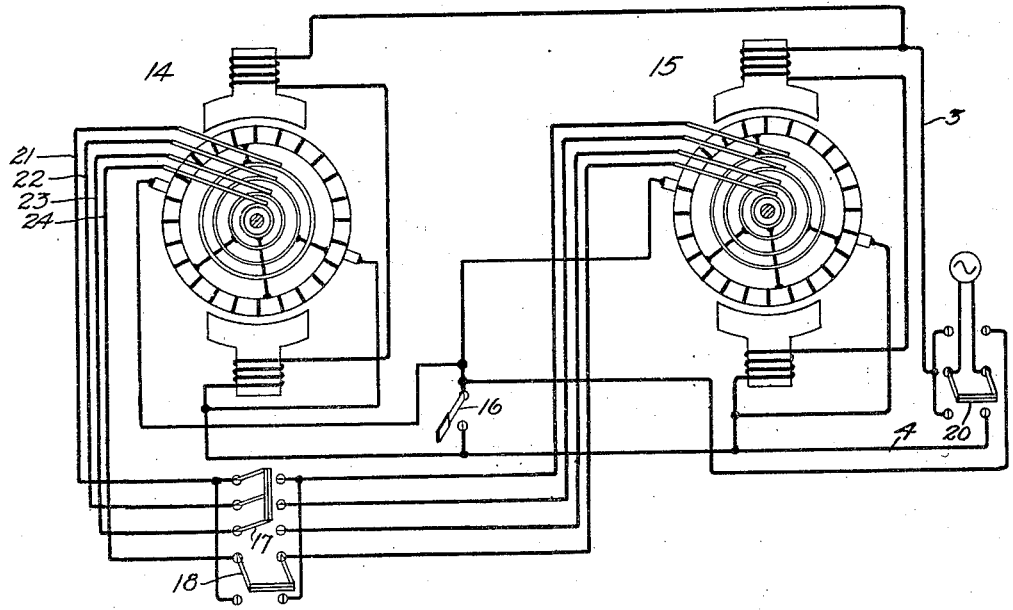
Fig. 3 shows one manner in which a plurality of repulsion-synchronous machines may be started in step and run in synchronism.

In Fig. 3. two machines 14 and 15 are shown connected across the supply mains 3, 4, and arranged to start as series motors electrically locked and to be converted into repulsion-synchronous machines of the type shown in Fig. 2. With switch 17 closed and switches 16 and 18 both open, and switch 20 closed to its upper position, the machines are connected as series machines with separate low-impedance connections from one to the other between respective points in their armature circuits 120 electrical degrees apart, these connections being via switch 17, conductors 21, 22, 23 from machine 14, the corresponding conductors leading from machine 15, and the cooperating brushes and slip rings. Transfer of energy along these connections from one armature to the other equalizes any tendencies of one machine to exceed or fall behind the speed of the other, and both machines start and accelerate in step with each other.

Closure of switch 16 completes short circuits between the brushes of the respective commutators. Closure of switch 18 establishes individual fixed short circuits across fixed points in the respective armature circuits. With switch 17 now open, the motors continue in synchronism with each other by virtue of their repulsion-synchronous connections, as in the case of the previous figures.

While the machines may be started in the manner described above, the preferred starting routine is as follows: With switches 16 and 18 open and with switch 17 closed, switch 20 is thrown to its lowermost position. The power is thus applied directly across the field windings of both machines. Neither machine under these conditions will rotate, but their armatures may vibrate and will finally come to rest in exactly the same respective position. After the armatures of the several machines have thus been lined up, switch 20 is thrown to its upper position resulting in connecting both machines as series machines across the mains 3 and 4. Both machines start together and since switch 17 is closed they accelerate in step with each other. When the proper speed has been attained, switches 16 and 18 are closed and switch 17 may then be opened to prevent either machine from hunting in case mechanical vibrations take place in the other machine or machines as mentioned above.

Throughout the specification and claims where short circuits are spoken of, it is intended to include within this term a low impedance connection.

The invention is capable of many modifications and forms of embodiment other than those which have been shown, and its scope is defined by the claims.

What is claimed is:

1. In combination, a plurality of dynamo-electric machines, means for connecting the field and armature of each machine in series across an alternating current supply line for starting, means for also establishing connections between corresponding points in the armature windings of said machines the points in each machine being separated at 120 electrical degrees from one another, to cause said machines to accelerate in step, and means for thereafter opening said connections and for converting each of said machines to a repulsion-synchronous machine.

2. In combination, a plurality of dynamo-electric machines situated at a distance from each other and having individual loads, means to apply alternating current power to all of said machines simultaneously, their fields and armatures being respectively in series with one another to cause said machines to start as series machines, a separate connection from each of a plurality of points in the armature winding of each machine to a corresponding point in the armature winding of another of said machines for interlocking said armatures to cause them to accelerate in step with one another, and means for thereafter opening said connections and for closing an individual short circuit across the brushes of each of said machines and an individual short circuit between two points in the armature circuit of each machine substantially 180 electrical degrees apart to cause said machines to run as repulsion-synchronous motors.

In witness whereof, I hereunto subscribe my name this 7th day of March A. D., 1924.

OLIN L. DUPY.